United States Patent [19]

Sziklas et al.

[11] Patent Number: 4,682,339
[45] Date of Patent: Jul. 21, 1987

[54] LASER ARRAY HAVING MUTUALLY COUPLED RESONATORS

[75] Inventors: Edward A. Sziklas, Glastonbury; Gary E. Palma, Bloomfield, both of Conn.

[73] Assignee: United Technologies Corporation, Hartford, Conn.

[21] Appl. No.: 890,587

[22] Filed: Jul. 30, 1986

[51] Int. Cl.$^4$ ............................................... H01S 3/08
[52] U.S. Cl. ....................................... 372/95; 372/18; 372/108; 372/94; 372/103
[58] Field of Search ................... 372/95, 97, 108, 103, 372/92, 94, 18

[56] References Cited

U.S. PATENT DOCUMENTS

| | | | |
|---|---|---|---|
| 3,921,096 | 11/1975 | Chenausky et al. | 372/95 |
| 4,164,366 | 8/1979 | Sziklas et al. | 372/95 |
| 4,170,405 | 10/1979 | Sziklas | 372/95 |
| 4,249,140 | 2/1981 | Frieberg | 378/95 |

Primary Examiner—Léon Scott, Jr.
Attorney, Agent, or Firm—Eric W. Petraske

[57] ABSTRACT

An array of unstable laser resonators has a set of coupling beam paths, each of which carries coupling radiation to and from output regions of a pair of resonators in the array, so that pairs of resonators are symmetrically coupled to one other.

5 Claims, 2 Drawing Figures

LASER ARRAY HAVING MUTUALLY COUPLED RESONATORS

TECHNICAL FIELD

The field of the invention is that of high power lasers including both CW and pulsed and multiline multimode laser arrays.

BACKGROUND ART

It is known in the field of laser research that all laser systems are limited in the amount of power that can be extracted from a single optical resonator. Accordingly, workers in the field have attempted to scale-up in power by combining a number of laser resonators or amplifiers to form a single output beam. Among the many approaches that have been tried, the MOPA (Master Oscillator Power Amplifier) is applicable to multiline, multimode operation. However, the mode control and extraction efficiency of amplifiers is in general inferior to that of oscillators, resulting in a poorer efficiency of the overall system. It is also known to use injection locking of a number of resonators locked to a single master oscillator. The locking range for such a system is very narrow when the system is configured to provide good mode control and extraction efficiency. It is also known to couple radiation between resonators, where several cavities share a common element or otherwise overlap. All of the prior art approaches have different drawbacks that limit the amount of power that can be provided.

DISCLOSURE OF INVENTION

The invention relates to a multiresonator laser array in which a number of lasers having an unstable resonator configuration have mutual coupling to one another.

A feature of the invention is the symmetric coupling of a portion of collimated output beam from an output section of one laser resonator into a corresponding portion of the output section of a second laser resonator and vice versa.

An advantageous feature of the invention is that when the mutual coupling is strong enough, the length control requirements are comparable to those of a MOPA system, while the mode control is comparable to or better than that achieved in injection locked configurations. The resulting system eliminates the performance limitations of MOPA and injection locked configurations while providing a more reliable, completely modular system with the elimination of the master oscillator.

A further feature of the invention is that the individual resonators, as indicated above, are constructed to be identical, single-mode devices, all of them producing the same high-brightness output mode.

Other features and advantages will be apparent from the specification and claims and from the accompanying drawings which illustrate an embodiment of the invention.

BEST MODE FOR CARRYING OUT THE INVENTION

Figure 1:
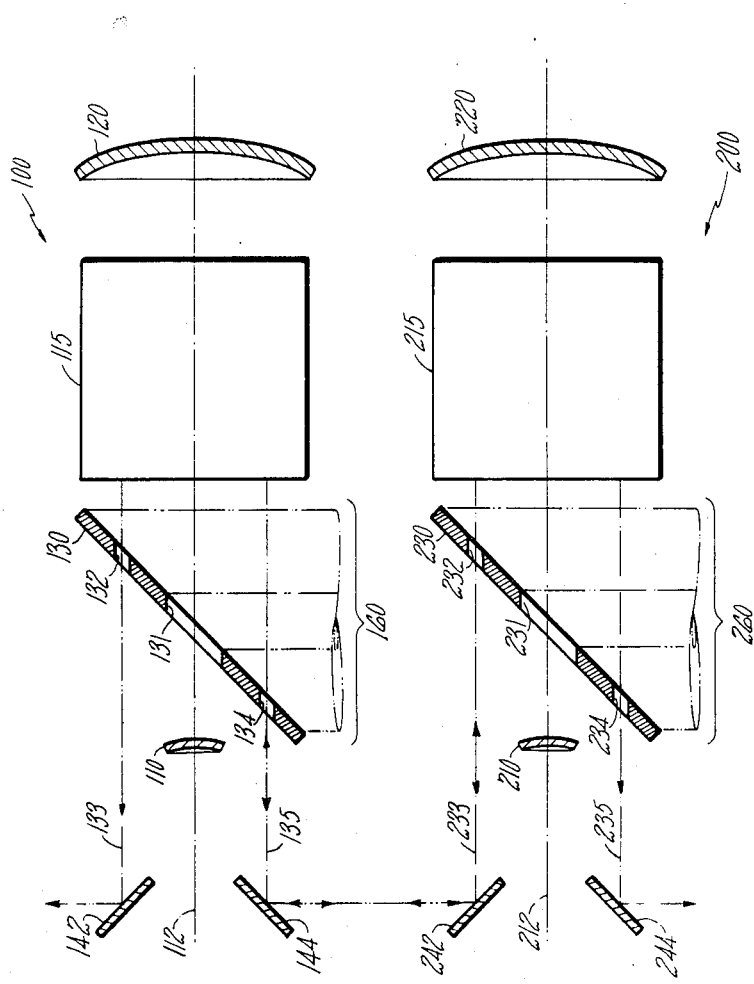
FIG. 1 illustrates schematically two resonators of a multi-resonator array constructed according to the invention.

FIG. 1 illustrates two unstable laser resonators indicated generally by the numerals 100 and 200. Laser 100 comprises a convex mirror 110, concave mirror 120 and placed on axis 112 and an output coupling mirror 130. This three mirror resonator configuration is conventional in the art and has been illustrated in simplified form, omitting pumping means, gas flow means and other conventional portions of the apparatus. The term "unstable laser resonators", as used herein, includes such conventional components. Many other resonator configurations could be used as part of an array constructed according to the invention. A second, identical, resonator 200 is shown below resonator 100, in which corresponding elements have the same identifying numeral but increased by 100.

In operation, radiation is resonated in gain medium 115, illustratively $CO_2$, as is well known in the art. Within the central portion of the resonator, close to axis 112, the radiation diverges gradually until it produces a collimated beam having the diameter of mirror 120 that is deflected by scraping mirror 130, which is a conventional mirror having a central aperture 131 sized to fit convex mirror 110. The term feedback region will be used to refer to the region between mirrors 110 and 120 and defined by aperture 131, where the radiation leaving mirror 120 can strike mirror 110 and be fed back. The region outside the feedback region will be referred to as the output region. Radiation diverging from mirror 120 that is in the output region will strike mirror 130 and be deflected out of the cavity. Additional output coupling holes are provided in mirror 130, and denoted by the numerals 132 and 134 respectively. Each of these holes permits a small portion of the collimated output radiation, which will serve as coupling beams, to pass through the mirror and be deflected by turning mirrors 142 and 144 as shown. The two coupling beams are indicated by the numerals 133 and 135 respectively. Beam 135 is coupled into resonator 200; beam 133 is coupled into an adjacent resonator which is above resonator 100 but not pictured in FIG. 1.

Coupling beam 135 is deflected by turning mirror 144 through a 90 degree angle and then again deflected by mirror 242 corresponding to mirror 142 in resonator 100, passing into resonator 200 through corresponding coupling hole 232. Similarly, output radiation from laser 200 passes outwards along line 233 and symmetrically enters resonator 100. The two resonators are thus symmetrically and mutually coupled through the collimated portion of the radiation.

An important feature of this invention is the method by which the coupling beams enter the individual resonators. A portion of the collimated output beams of one resonator is deflected into an adjacent resonator where it is reflected off concave mirror 220 or 120. This causes the coupled radiation to walk into the axis of the resonator where it spreads by diffraction, turns around, and walks out of the resonator. This method of coupling maximizes the effectiveness of the coupling beams and is an important feature of this invention.

In the example shown, the optical resonators are confocal, so the radiation in the output region is collimated. Coupling is simple, in this case, because the injected radiation will be mode-matched to th adjoint mode of the resonator. A definition of adjoint modes is given in "Orthogonality Properties of Optical Resonator Eigenmodes", *Optics Comm.*, Vol 31, pp. 369-373, Dec. 1979. In general, for non-collimated radiation in the output region, it will be necessary to transform the coupling beams using standard mode-matching techniques to match the adjoint mode of the resonator.

Laser 200 generates radiation in the same fashion as laser 100 and couples its radiation through output coupling beams 233 and 235 exactly as does laser 100. Any number of resonators may be mutually coupled using the same principles. The use of two right-angle deflections is not essential, and those skilled in the art will readily be able to devise different beam transport systems.

The performance of the coupled resonator array is determined by the modes of the individual resonators and the number, size, and placement of the mutual coupling apertures. These factors influence the quality and sensitivity to mirror vibrations of the coupled resonator modes. A configuration which has high brightness modes (meaning a mode that focuses to a minimum spot size in the target plane) that are insensitive to mirror vibrations results when the total optical energy transmitted through coupling apertures 132 and 134 is made equal to the total optical energy reflected from convex mirror 110. The most insensitive configuration results when each laser is coupled to every other laser in the array with the coupling power equally distributed over as many other resonators as possible.

The high-power output beams of lasers 100 and 200 are shown in the drawing as beams 160 and 260 respectively, having the typical doughnut shape characteristic of a scraper mirror with a central aperture. These beams are combined and matched in phase by conventional optical means well known to those skilled in the art that does not form part of this invention. A number of examples of alternate approaches for combining and phasing beams are given in an article: SYNTHETIC APERTURE SYSTEMS, in Proceedings of the S.P.I.E., Vol. 440 (1984).

Figure 2:
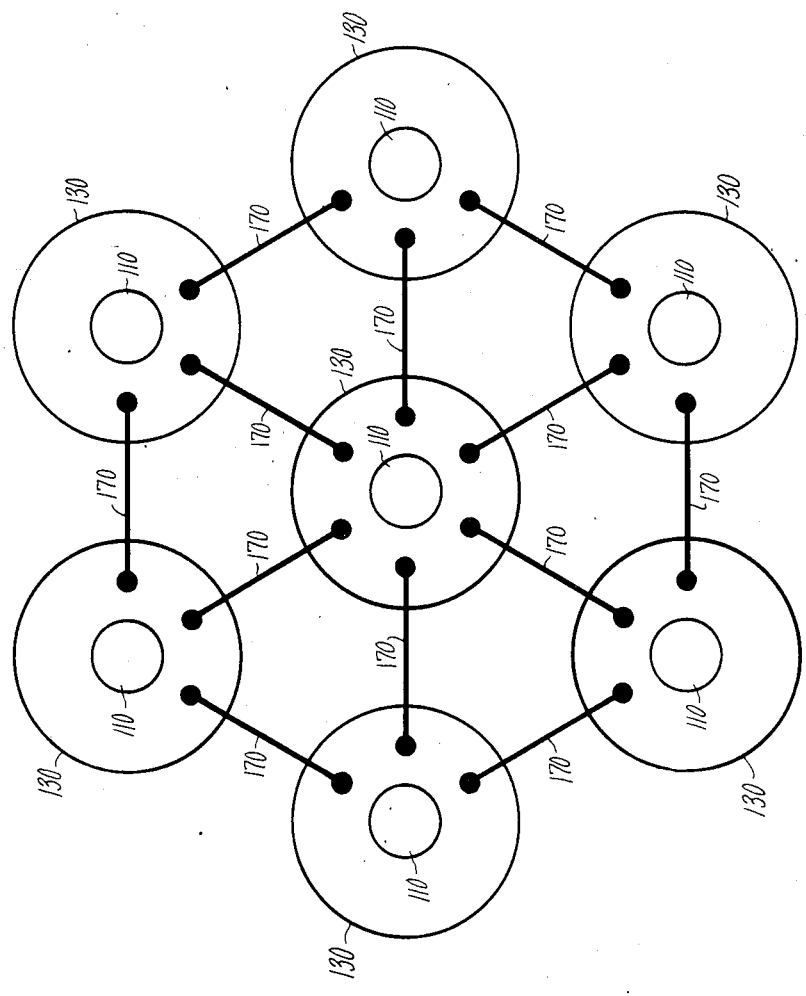
FIG. 2 illustrates schematically a multi-resonator coupling configuration.

Referring now to FIG. 2, there is shown a plan view of an array of seven resonators, in which seven mirrors 130 are shown together with seven convex mirrors 110. The resonators extend into the plane of the paper and other elements of the resonators are suppressed in order to improve the clarity of the drawing. The heavy black lines labelled by the numeral 170 are a schematic representation of a pair of turning mirrors such as 144 and 242 in FIG. 1 and the beam coupling them. It can readily be seen that the circumferential lasers in the hexagonal ring are each coupled to three other resonators, with the central resonator being coupled to all six of the circumferential ones. In this application, the individual coupling beams shared between the circumferential lasers and those shared with the central laser should be in the power ratio of 5:2.

An unexpected result of this invention is that the use of a relatively strong coupling between resonators does not produce an unduly sensitive system. Extensive experience with MOPA configurations has taught those skilled in the art to isolate the master oscillator from the power amplifier by devising asymmetric one-way beam coupling schemes. In contrast, it is important in the use of this invention that the coupling be bi-directional (though it need not be exactly symmetric).

Each of the individual laser resonators by itself is constructed to provide a high quality output beam as is known in the art. Examples are given in "Unstable Resonators", *Laser Handbook*, Vol 3, pp. 3-39 (1982); "Effects of Small-Scale Phase Perturbations on Laser Oscillator Beam Quality", *IEEE. Journal of Quantum Electronics*, Vol 13, pp. 334-337 (May 1977); and "Mode Calculations in Unstable Resonators with Flowing Saturable Gain", *Applied Optics* Vol 14, pp 1874-1889 (1975).

A further advantage of the invention is that the well known problem of isolating the master oscillator from the power amplifier is not present in this system. Equalization of the mutual coupling power to the feedback power within each resonator results in a coupled resonator configuration that operates on high-brightness modes only, which are also insensitive to the effects of mirror vibrations. The optimum configuration results when each resonator in the array is coupled to every other resonator in the array, but a lesser degree of coupling, such as that shown in FIG. 2 is acceptable. The injection of a portion of the output beam of one laser in a direction opposite to the output beam of an adjacent laser maximizes the efficiency of the coupling.

Laser systems constructed according to the invention do not need a master oscillator in order to achieve a set of matched output beams.

Those skilled in the art will readily be able to devise any number of phased-array laser resonator systems according to the invention and the scope of the claims attached hereto is not meant to be limited by the example disclosed.

It should be understood that the invention is not limited to the particular embodiments shown and described herein, but that various changes and modifications may be made without departing from the spirit and scope of this novel concept as defined by the following claims.

We claim:

1. A laser system having at least two independently pumped unstable laser resonators, each having a feedback region in which optical radiation resonates, an output region in which output radiation exits from said feedback region and an output coupling means for coupling out a main beam from said output region in which laser extracted radiation extracted from a first one of said at least two unstable laser resonators is coupled unidirectionally into at least one other of said unstable laser resonators, whereby said extracted radiation from said first unstable laser resonator influences said at least one other unstable laser resonator, wherein the improvement comprises a system in which each of said resonators is mutually and substantially symmetrically, bidirectionally coupled to said at least one other unstable resonator, through extraction means for extracting at least one coupling portion of said output radiation having, in total, a coupling radiation power and transporting means for transporting said at least one coupling portion of said output radiation that is mode-matched to an adjoint mode of said at least one other unstable laser resonator into at least one corresponding output region of said other one of said at least two unstable laser resonators to produce a laser system having a scaled-up laser output.

2. A laser system according to claim 1, in which said extraction means in each of said at least two unstable laser resonators includes at least one aperture in said output coupling means for removing a first coupling portion of radiation from said main beam to form a set of at least two coupling beams directed away from said at least two unstable laser resonators;

and in which said transporting means includes a bi-directional train of optical elements for transporting a first one of said set of at least two coupling beams from said at least one aperture in said output coupling means of a first one of said at least two unstable optical resonators into said at least one aperture in said output coupling means of a second one of said set of at least two unstable laser resonators, whereby said first and second optical resonators are mutually coupled by a single optical path and said apertures are used for both output and input of said at least two coupling beams.

3. A laser system according to claim 2, in which each of said at least two unstable laser resonators has substantially the same dimensions and power.

4. A laser system according to claim 2, in which at least one of said at least two unstable laser resonators is directly coupled to all of the remaining unstable laser resonators.

5. A laser system according to claim 1, in which the power reflected from said convex mirror in each of said unstable laser resonators is substantially equal to said coupling radiation power.

* * * * *